Dec. 1, 1964 A. G. SCHRODT ETAL 3,159,745
RADIOACTIVITY SOURCE-AND-DETECTORS DEVICE FOR MEASUREMENT
OF PROPERTIES OF MATERIALS
Filed June 17, 1960 3 Sheets-Sheet 1

Inventors:
Ariel G. Schrodt
Philip Shevick
By: Stone, Nierman,
Burmeister & Zummer
Attorneys

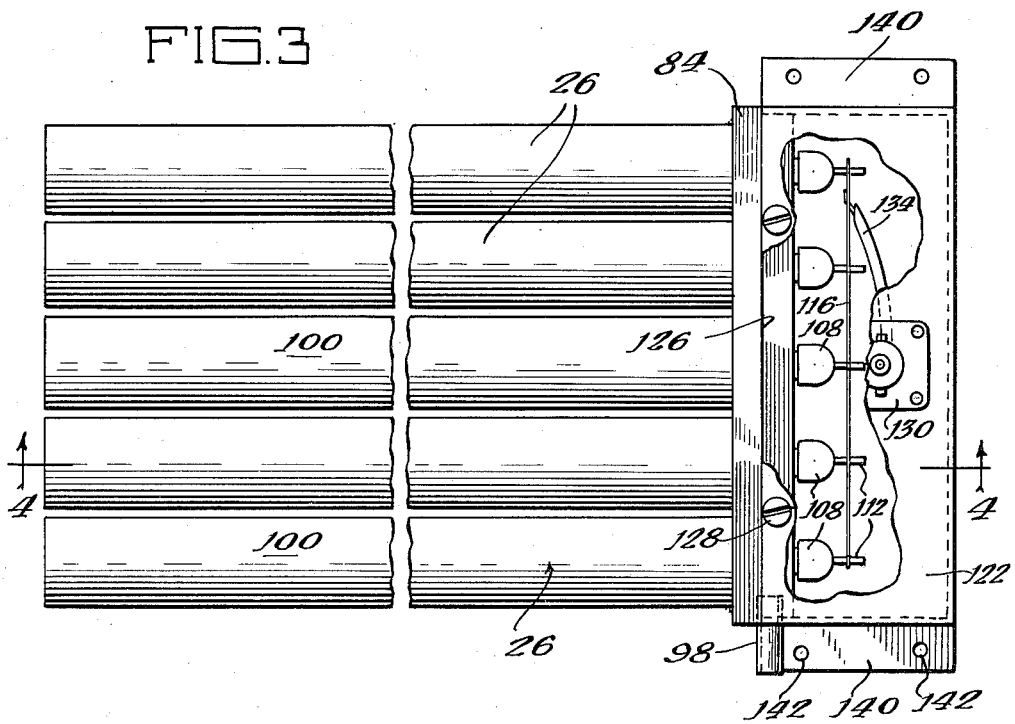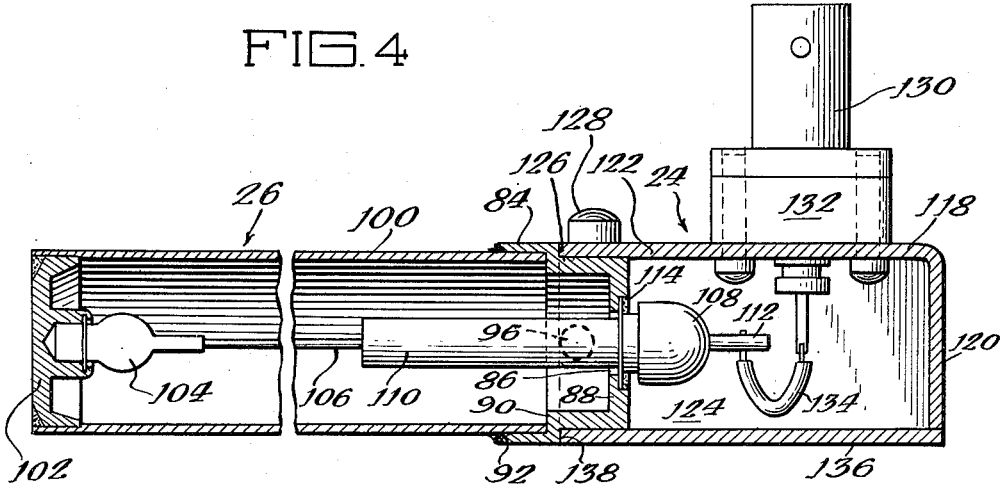

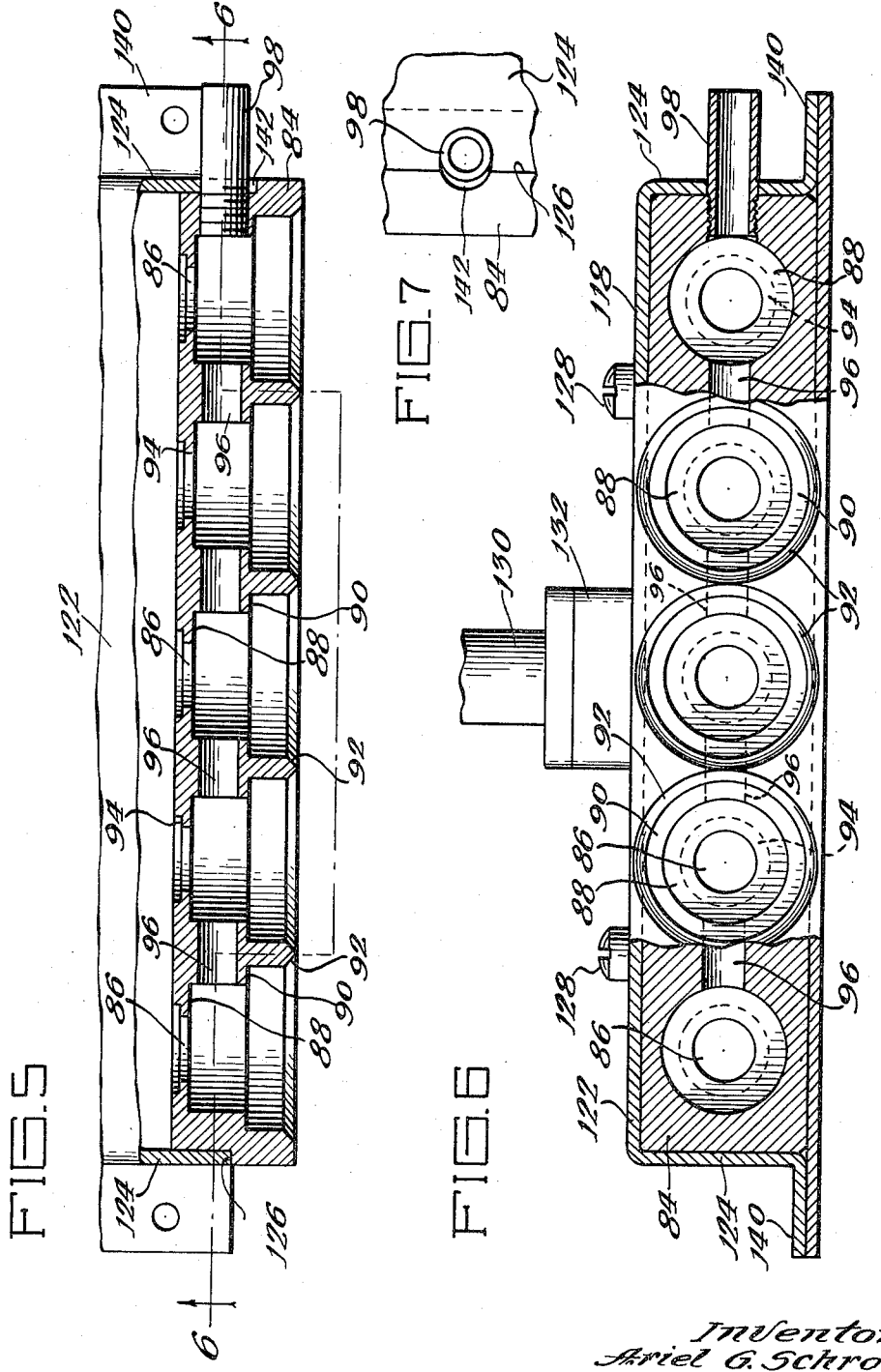

United States Patent Office 3,159,745
Patented Dec. 1, 1964

3,159,745
RADIOACTIVITY SOURCE-AND-DETECTORS DEVICE FOR MEASUREMENT OF PROPERTIES OF MATERIALS
Ariel G. Schrodt, Wilmette, and Philip Shevick, Skokie, Ill., assignors to Nuclear-Chicago Corporation, Des Plaines, Ill., a corporation of Delaware
Filed June 17, 1960, Ser. No. 36,852
11 Claims. (Cl. 250—83.1)

This invention relates to radioactivity measuring instruments, and more specifically to instruments for the measurement of properties of materials, particularly of the type in which a neutron source and a series of neutron counters are employed for producing an indication of the properties of adjacent materials.

In the copending applications of Raymond L. Meeder and Charles E. Mielke, filed January 5, 1960, Serial No. 617, now Patent 3,126,484, and of Robert L. Carver and Philip Shevick, filed June 17, 1960, Serial No. 36,945, abandoned upon the filing of a continuation-in-part thereof on November 20, 1963, Serial No. 325,186, there are described and claimed certain features of a source-and-detector probe for the measurement of moisture in earth or soil surfaces. The present invention is particularly adapted for use in a device such as that which is described in the applications mentioned, and accordingly is herein illustrated in that environment.

As shown in these copending applications, and particularly in the last mentioned, a desirable form of probe for surface moisture measurement in soil has a detecting area in a plane substantially surrounding the source, which is most readily formed by sets of parallel coplanar thermal neutron counting tubes extending in at least two directions from the source of fast neutrons, thus minimizing the source intensity required for the production of a reliable measurement in a limited time.

The present invention stems from the fact that the arrangement of counters to form a detecting area in which the neutron source is centered, as summarized above from the copending applications, creates serious problems of maintenance and lifetime of the instrument. Known conventional neutron counters employ, for the production of sensitivity to thermal neutrons, an absorber, commonly boron, which produce ionizing radiation upon neutron absorbtion. Since the nuclear transformation which produces the latter effect is inherently consumptive of the neutron absorber, the useful life of such a neutron counter is limited by the total thermal neutron irradiation to which it is exposed. In any type of counter array, of which many forms have been used for various purposes, occasional replacement of one or more counters because of lifetime limitation (dependent upon the endpoint tolerable for any particular use), is required. In most uses of arrays, it is common to replace the entire array in a single servicing operation, since differences in temporal lifetime of the various counters of the array are negligible. Frequently the entire array, or substantial segments thereof, is or are constructed as a unit, both for purposes of economy in manufacture and simplicity in servicing.

In the case of a unitary source-and-detector probe, particularly for commercial manufacture and use, in which the counters are at varying distances from the source, there is created, with conventional constructions, a serious problem of temporal lifetime differentials among the counters. Where the distance of the source from the respective counters varies by large multiples, as is the case in, for example, surface measurements of the type under discussion, conventional servicing operations, such as periodic replacement of the entire counter array, involved great economic waste, since in general, with such a source and detector geometry, the useful lifetime of the array is limited by that of the counter closest to the source, so that replacement of the entire array, with conventional constructions, constitutes a great economic waste. It is, of course, possible to employ completely separate individual counters and to replace them individually when the end-point is reached. Alternatively, is is possible to use individual counters and move them inwardly toward the source or otherwise rearrange them occasionally according to a calculated plan in order to utilize fully the lifetime of each. However, the servicing operations involved in such a scheme are both frequent and complex.

In the design of a commercial instrument for general use in industry, agriculture, etc., unlike the design of laboratory instruments, the problem of servicing, i.e., of providing a construction in which frequency and complexity of servicing is minimized, can well be critical to utility of such as device for its intended purpose. This is particularly true of instruments employing radioactivity, because servicing operations must in general be performed by persons not only trained in electronics and similar arts, but also fully trained in the handling of radioactive materials and knowledge of the nature and scope of their hazard, specific license being required by law for servicing operations in most instances. Accordingly, since such personnel are not readily available at most places, widespread use of any radioactivity instrument necessarily relies upon freedom from the necessity of frequent servicing.

The present invention provides a construction in which the requirement for servicing is substantially reduced as compared with conventional systems. In the present invention, there is employed the type of neutron detector in which the thermal neutron absorbing substance is incorporated in the counter gas filling (the conventional boron trifluoride neutron counter, for example). Successive counters extending away from the source are interconnected by gas passages, so that gaseous diffusion automatically equalizes the consumption of neutron absorber in all of the counters. In this maner, there is eliminated the large difference in temporal lifetime which otherwise exists between the counters, thus fully utilizing the lifetime capabilities of all members of the set of counters without the necessity of intermediate servicing operations between the time when all the counters are new and all are exhausted.

From the above, it might appear that all of the counters in the entire array might well be so interconnected. However, it has further been recognized that such an arrangement is not desirable. Consideration of factors other than lifetime enters into the problem of maintenance. Despite maximum skill and effort in the design and production of highly reliable counters, which can and do, with modern techniques, make lifetime the normal limit or requirement for servicing operations of replacement of counter tubes, occasional faults, particularly by way of leaks, will nevertheless occur in use of the counters. If all of the counters in the entire array are interconnected by gas passages, any leak requires replacement of the entire array. Furthermore, development of any other defect, such as a broken center wire in one of the counters, will also require replacement of the entire array, unless there is to be introduced such complexity as a series of valves between counters. The present invention recognizes that the interconnection of all of the counters surounding the source to form a common gas space accomplishes nothing regarding the matter of differential exposure of the counters at varying distances, while imposing the practical necessity of replacement of all of the counters at one time in the event of development of any defect. In the present construction, only the counters extending from the source in one direction are so interconnected. In principle, the optimum configuration from this standpoint would use wedge-shaped sets of counters to form the neutron detecting planar array. However, when the matter of original cost is considered, the use of two sets, one on each side of the source, is dictated, since the square detecting area may be formed from identical counters.

Subsidiary to the objects and purposes described above, the invention provides a novel construction for the sets of counters so described, permitting their manufacture at a minimum of cost without any sacrifice of reliability or durability, and facilitating the handling of each set of counters as a unit. For more complete understanding of the manner in which this is done, and also of further constructional features and advantages afforded by the invention, reference is made to the embodiment of the invention illustrated in the attached drawing, in which:

FIGURE 3 is a top plan view of a neutron counter set made in accordance with the invention, a portion of a cover illustrated therein being broken away for clarity of illustration;

FIGURE 4 is a longitudinal sectional view taken along the line 4—4 of FIGURE 3 in the direction indicated by arrows;

FIGURE 5 is a horizontal sectional view showing a header block constituting a portion of the counter set together with a fragment of the cover;

FIGURE 6 is a vertical sectional view taken along the offset line 6—6 of FIGURE 5; and FIGURE 7 is a fragmentary end view of the device of FIGURE 6.

Figure 1:
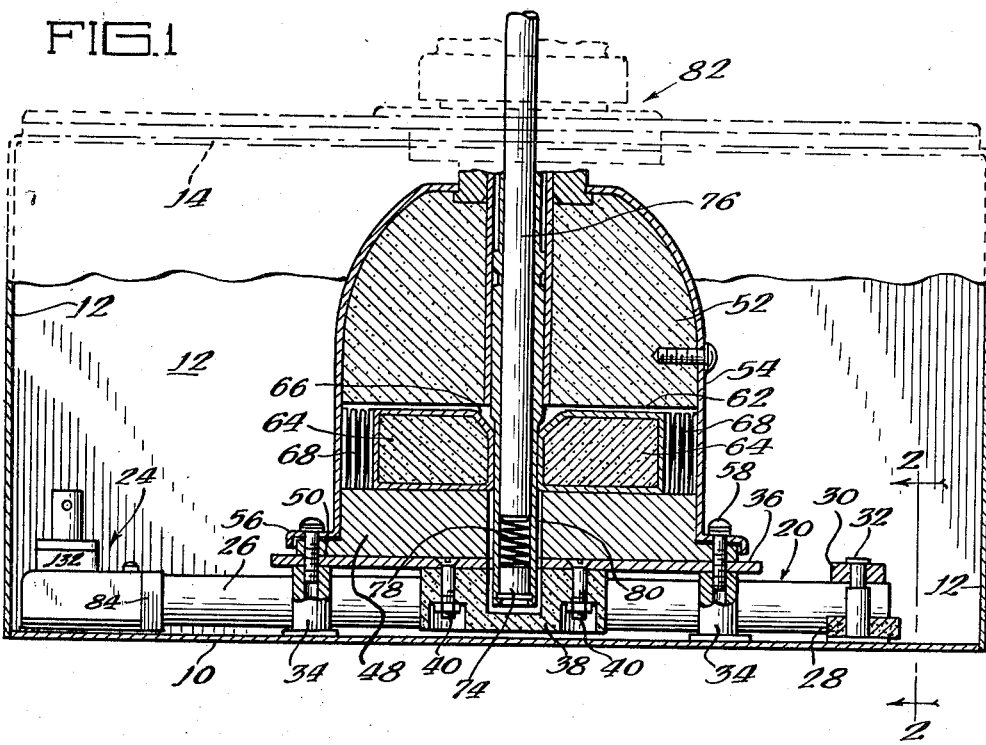
FIGURE 1 is a vertical sectional view of a neutron moisture gauge for surface materials such as soil, embodying the present invention.
Figure 2:
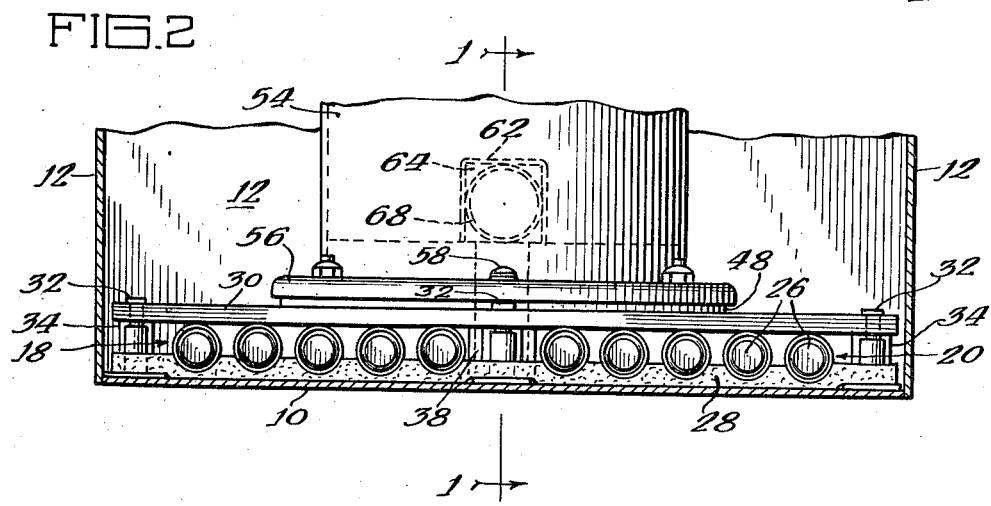
FIGURE 2 is a vertical sectional view taken along the line 2—2 of FIGURE 1 in the direction indicated by arrows.

Referring now to the drawing, it will be seen that the elements of the probe are enclosed in a housing having a bottom 10, sidewalls 12, and a top 14. On the bottom 10, which is transparent to neutrons of all energies, there is mounted an array of neutron detectors formed of two groups or sets 18 and 20, parallel with each other and spaced by a small central gap. Each group of detectors has a header portion 24, from which extend five parallel tubular counter portions 26. The outer ends of the tubular counters rest on a resilient support 28, all of the outer ends being positioned by a clamp bar 30 secured by screws 32. Spaced from the bottom 10 by posts 34 of sufficient height to clear the detector array is a support plate 36. A shield cup 38 is secured to the under side of the support plate 36 at the center by bolts 40, the shield cup being disposed in the gap between the detector sets 18 and 20 forming the array.

A neutron reflector 48, having a flange at 50, rests on the support plate 36. On the reflector 48 is a more or less hemispherical gamma ray shield 52. A cover or sheath 54 provided with a flange 56 mating with the flange 50 covers the shield and reflector and holds them in position, the entire assembly being secured in place by bolts 58. The underside of the shield 52 has a diametric channel 62 in which are slidable shield blocks 64 with upwardly facing cam surfaces 66, the slide blocks 64 being biased inwardly by springs 68 to the position in which they meet (not illustrated). A source capsule 74 containing a radium-beryllium source and a rod 76 retaining the capsule 74 in position by means of a spring 78 are all encased in a hollow rod or tube 80, the vertical manipulation of which selectively raises the source into the shield with the slide blocks closed, or drops the source into the cup 38 through apertures in the reflector 48 and support plate 36 for the making of a measurement, as shown in FIGURE 1. The tube 80 is provided with camming and locking surfaces cooperating with a locking hub structure 82.

The portion of the illustrated device thus far described, other than the construction of the counters, to be described in more detail below, and their orientation with respect to the source constitute no part of the present invention, certain of these features being the subject of the copending applications mentioned above.

The construction of the counter sets 18 and 20 is shown in detail in FIGURES 3 through 7. As therein seen, the counters are mounted on a rectangular header block 84 having a series (5 in the illustrated instance) of equally spaced bores or apertures 86. The bores 86 are formed with two successive enlargements to form shoulders at 88 and 90, the extreme outer end being counterbored or beveled at 92. An additional shoulder 94 is provided for each of the apertures 86 on the opposite surface of the block 84. The recesses or cavities in the block between the shoulders 88 and 90 are interconnected by passages 96 formed by a single straight hole drilled through one end of the block, a filling tube 98 being threaded into the outer end. Seated on the shoulders 90 are tubular counter bodies or electrodes 100, the outer ends of which are sealed by end caps 102. The inner ends of the counter bodies 100 are sealed to the block by solder in the bevel at 92. A glass bead insulator 104 in each end cap 102 supports the center wire 106, which is supported at the opposite end by a glass to metal seal 108 having as a portion thereof an insulator sleeve 110, so that the active body of the counter, which is preferably about 6 or 8″ long, as described in the copending applications mentioned, is defined by the region between the two insulators. A terminal 112 extending through each seal 108 constitutes the outer electrical connection of the axial electrode. The seal 108 is provided with a ring 114 seated on the shoulder 94 and soldered to complete the sealing of the enclosure. A header lead 116 interconnects all of the terminals 112. A cover 118 having a back panel 120, a top panel 122, and side panels 124, is fitted over the block, which is rabbeted at 126 on its top and side to receive the forward end of the cover, which is secured in position by screws 128.

A coaxial connector 130 is mounted on the cover top 122 with the aid of a spacer 132 to permit shallow construction of the cover. A lead wire 134 connects the central conductor of the coaxial connector 130 to the header lead 116 to form a common electrical connection for all of the counters. The enclosure of the electrical connections is completed by a bottom plate 136 seated on a shoulder or rabbet 138 on the bottom of the header block and secured by flush screws (not shown). The bottom plate 136 extends laterally beyond the ends of the header block, and the cover is formed with flanges 140, the flanges 140 and the extending ends of the bottom plate 136 having registering apertures for securing the counter assemblies or sets to the bottom plate 10 of the probe housing by screws (not shown). The front edge of one side panel 124 is notched out at 142 to pass the filling tube 98 and thus permit unimpeded installation and removal of the cover.

It will be seen that the set of counters may readily be filled and refilled through the filling tube 98, all of the recesses or cavities in the block which are connected with the interiors of the counters being connected by the gas passages 96 for the purposes of minimizing of servicing and full utilization of the lifetime of the counters, as earlier discussed. It will further be seen that in addition to these advantages, which may be obtained by application of the broader teachings of the invention to other specific structures, the present construction offers great simplicity and ease in fabrication, coupled with durability and reliability, the manner of formation of the entire set of counters upon the single block, and their interconnection by the single bore, which also serves as gas inlet, offering substantial cost reduction as compared with other constructions for such sets of counters.

Obviously, persons skilled in the art will readily adapt the various teachings of the invention, both broad and narrow, to devices far different in appearance and in details of operation from that herein illustrated. Accordingly, the scope of the invention shall not be deemed to be limited by the present embodiment, but shall be determined only from the appended claims.

What is claimed is:

1. An assembly for determination of properties of a surface material comprising a plurality of coplanar parallel cylindrical tubular electrodes closely spaced in the direction transverse to their common direction of extension each having an axial electrode to form a counting tube, all of said cylindrical electrodes being conductively interconnected and all of said axial electrodes being conductively interconnected, gas passage means interconnecting all of the interelectrode regions, a thermal-neutron-absorbing neutron counter gas filling in the common gas space thus formed and a fast neutron source outwardly adjacent to the longitudinal center of one of the outermost tubular electrodes and substantially in the plane formed by the tubes, whereby the consumption of the neutron-absorbing constituent of the gas filling is equalized in all of the tubes by gaseous diffusion.

2. The assembly of claim 1 having on the opposite side of the neutron source a substantially identical and coplanar plurality of counting tubes formed as recited and having a separate and independent common gas space.

3. A neutron counter assembly comprising a unitary conducting header block having a plurality of surface recesses therein, tubular electrode members having ends coaxial with the recesses and extending from the block in conductive connection thereto, each tubular electrode having a conducting cap member on the outer end thereof and an axial electrode insulatedly supported by the block and the cap member to form a counting tube, short-circuit means interconnecting the axial electrodes, gas passages in the block interconnecting the recesses, and a thermal-neutron-absorbing neutron counter gas filling in the common gas space thus formed.

4. Measuring apparatus comprising, in combination, the counter assembly of claim 3, and a fast neutron source, and means for mounting the source at a location unequally spaced from the counting tubes.

5. A radiation counter assembly comprising a unitary metal block, a line of recesses extending along a surface of the block, tubular electrode members having ends coaxial with the recesses and extending from the block, each tubular electrode having a conducting cap member on the outer end thereof and an axial electrode insulatedly supported by the block and the cap member to form a counting tube, and a single linear bore extending in a direction parallel with the line of the recesses inward from a surface of the block and connecting all of the recesses to form a common gas space for all of the counters which may be filled through the portion of the bore at the surface of the block.

6. The assembly of claim 5 wherein each axial electrode is connected exteriorly by an insulating seal mounted on the block, and means for interconnecting all of the axial electrodes on the side of the block opposite the direction of extension of the counters.

7. A neutron source-and-detector probe for measurement of surfaces comprising a neutron source and sets of neutron counters filled with thermal neutron-absorbing gas in at least two directions from the source at distances therefrom varying successively in each set, all of the counters in each set having a common gas space and having corresponding electrodes mutually interconnected, but sets in each direction having separate and mutually independent gas spaces, whereby consumption of the neutron-absorbing constituent of the gas filling as a function of distance from the source is always equalized by gaseous diffusion without the necessity of replacing all counters in the event of development of a defect in any one.

8. A radioactivity measuring device having a radioactivity source and a set of parallel radioactivity detectors mutually spaced in at least one direction transverse to their common direction of extension, and at differing distances from the source, the distance of the innermost from the outermost detector being substantially greater than the distance from the source to the innermost detector, each detector containing an identical gaseous filling consumed at a rate substantially proportional to its counting rate, and gas passage means interconnecting all of the detectors, corresponding electrodes of all of the detectors being mutually conductively interconnected.

9. The device of claim 8 having a plurality of such sets of detectors, each extending in a different direction from the source and the corresponding members of respective sets being connected in parallel electrically but mutually isolated with respect to the passage of gas.

10. In a source-and-detector assembly for radioactivity measurements on properties of materials, a housing having a wall portion adapted to be placed adjacent to materials under measurement, a radiation source in the housing adjacent to said wall portion, a plurality of cylindrical gas-filled radiation counters each having a useful life limited by the radiation exposure of the gas filling, such counters forming a detecting region of substantial area parallel with the wall portion and being at substantially different perpendicular distances from the source, and gas-passage means interconnecting the counters.

11. The assembly of claim 10 wherein the source emits neutrons and the gas filling comprises a neutron-absorbing isotope.

References Cited in the file of this patent

UNITED STATES PATENTS

| | | |
|---|---|---|
| 2,472,153 | Fearon | June 7, 1949 |
| 2,499,311 | Herzog et al. | Feb. 28, 1950 |
| 2,641,710 | Pompeo et al. | June 9, 1953 |
| 2,781,453 | Belcher et al. | Feb. 12, 1957 |
| 2,884,529 | Eggler et al. | Apr. 28, 1959 |
| 2,899,582 | Hermsen et al. | Aug. 11, 1959 |
| 2,904,691 | Mulligan | Sept. 15, 1959 |
| 2,968,730 | Morris et al. | Jan. 17, 1961 |

OTHER REFERENCES

Maley: "Balanced Ionization Chambers Offer Sensitive Gas Analysis," Nucleonics, March 1960, page 126.